United States Patent [19]

Aubourg et al.

[11] 4,347,073
[45] Aug. 31, 1982

[54] METHOD OF PRODUCING GLASS FROM AGGLOMERATES WHICH INCLUDE ORGANIC COATED SCRAP GLASS

[75] Inventors: Patrick F. Aubourg, Granville; Mark A. Propster, Gahanna, both of Ohio

[73] Assignee: Owens-Corning Fiberglas Corporation, Toledo, Ohio

[21] Appl. No.: 242,879

[22] Filed: Mar. 12, 1981

[51] Int. Cl.³ ............................................. C03B 1/00
[52] U.S. Cl. .......................................... 65/28; 65/27; 65/62; 65/134
[58] Field of Search .................... 65/27, 28, 62, 134

[56] References Cited

U.S. PATENT DOCUMENTS

| | | | |
|---|---|---|---|
| 3,185,554 | 5/1965 | Sweo et al. | 65/134 X |
| 3,912,534 | 10/1975 | Gurta | 65/28 X |
| 4,145,202 | 3/1979 | Grodin et al. | 65/27 X |
| 4,184,861 | 1/1980 | Erickson et al. | 65/27 |
| 4,188,228 | 2/1980 | Brzozowski | 106/50 |
| 4,212,613 | 7/1980 | Seng | 425/141 |
| 4,248,615 | 2/1981 | Seng et al. | 65/27 |
| 4,248,616 | 2/1981 | Seng et al. | 65/27 X |
| 4,252,551 | 2/1981 | Nishimura | 65/28 |

Primary Examiner—Arthur D. Kellogg
Attorney, Agent, or Firm—Ronald C. Hudgens; Patrick P. Pacella; Robert F. Rywalski

[57] ABSTRACT

A process is provided for employing scrap glass (cullet) having an organic coating thereon in an overall process wherein molten-glass forming ingredients are converted into agglomerates and the agglomerates preheated to an elevated temperature prior to melting in a glass melting furnace. The organic coating is pyrolized, i.e., thermally decarbonized, during the preheating of the agglomerates.

9 Claims, No Drawings

METHOD OF PRODUCING GLASS FROM AGGLOMERATES WHICH INCLUDE ORGANIC COATED SCRAP GLASS

FIELD OF THE INVENTION

The present invention relates to the art of glass manufacturing, and more particularly it relates to processes for converting molten-glass forming ingredients into agglomerates and preheating the agglomerates prior to discharge into a glass melting furnace for melting. Even yet more particularly, the invention relates to the use of scrap glass in such agglomerates.

BACKGROUND AND SUMMARY OF THE INVENTION

Processes are generally known in the art for producing molten glass which comprise converting molten-glass forming ingredients and water into agglomerates, heating a vertical bed of gravitationally downwardly moving agglomerates in a chamber by direct contact with a gaseous heating medium so as to produce dry, heated, non-aggregated agglomerates and then melting said agglomerates in a glass melting furnace. Most commonly, such processes are practiced by employing a glass melting furnace which is combustion fired and by employing, as at least part of the gaseous heating medium, the flue gases emanating from such furnace and especially those flue gases which have been passed through a heat exchanger, for example, a recuperator or a regenerator. In this way, sensible heat from the flue gases, instead of being wasted, is used to dry and preheat the agglomerates and pollutants in the flue gases are at least partially recovered upon direct contact with the agglomerates and recycled into the melter. Such agglomerates may be either briquettes or pellets. Representative patents dealing with the above type processes are U.S. Pat. Nos. 4,212,613, 4,184,861, 4,248,615 and 4,248,616, all of which are hereby incorporated by reference.

Additionally, those skilled in the art readily appreciate that there is a substantial amount of scrap glass, or cullet, available for use in producing molten glass. Such cullet has an organic coating thereon and U.S. Pat. No. 4,188,228 is directed to employing such scrap glass in making pellets for use in manufacturing molten glass. That patent teaches one to remove the coating prior to employing such scrap glass in the process for forming pellets. Typically, according to that patent the organic coating is removed by burning. Thus, while this patent attempts to take advantage of the economical use of scrap glass, it, unfortunately, detrimentally affects the economy of the process by adding an additional step in the manufacturing process.

In accordance with the present invention, a glass manufacturing process is provided having improved economy by allowing for the use of scrap glass having organic coating thereon and without requiring a separate, additional step of removing such coating from the scrap glass prior to its use. That is, Applicants have surprisingly found that such cullet having an organic coating thereon may be combined with the other molten-glass forming ingredients and water to form the agglomerates, and that the organic coating can be pyrolized from the scrap glass in situ, i.e., the organic coating is thermally decarbonized during the heating of the agglomerates as they move gravitationally downwardly in a vertical bed in direct contact with a gaseous heating medium.

Thus, the present invention provides for an improvement in prior art processes of the type which comprised converting molten-glass forming ingredients and water into agglomerates, heating a vertical bed of gravitationally downwardly moving agglomerates in a chamber by direct contact with a gaseous heating medium so as to produce dry heated non-aggregated agglomerates, and melting the agglomerates in a glass melting furnace. The improvement essentially resides in employing, as a portion of the molten-glass forming ingredients, glass cullet having an organic coating thereon and pyrolizing the coating in situ during the heating step. That is, the heating step is done at a temperature and for a time sufficient to thermally decarbonize the organic coating on the glass fibers.

DESCRIPTION OF THE INVENTION

The foregoing incorporated patents generally disclose processes which are quite suitable in the overall process of the present invention. That is, they disclose processes wherein a gaseous heating medium is passed upwardly in direct contact to downwardly gravitationally moving agglomerates of a vertical bed. When the composition of the glass being manufactured is such that the bed of agglomerates converts into a monolithic unitary mass, the preferred overall process is that disclosed in U.S. Pat. Nos. 4,248,615 and 4,248,616. Such is typical for compositions containing, for example, in excess of about 5% by weight $Na_2O$ on a theoretical oxide basis. On the other hand, when the glass composition is not of such a nature, for example, an E type glass composition, a suitable method is disclosed in U.S. Pat. No. 4,184,861. When pollution abatement is of major concern, the preferred technique for heating the agglomerates in a vertical bed will be the heating gas by-pass technique set forth in co-pending application U.S. Ser. No. 158,558, which is likewise hereby incorporated by reference. Typically, the gaseous heating medium which is supplied to the vertical bed has a temperature in excess of about 700° or 800° F. (371° or 427° C.), more typically a temperature in the range of about 700° or 800° F. to about 1500° F. (371° or 427° C. to about 816° C.), and most commonly a temperature between about 900° or 1000° C. to about 1200° F. (482° or 538° C. to about 649° C.). The temperature of the heated agglomerates leaving the chamber containing the vertical bed closely approximates the incoming gas temperature. Additionally, while the chamber containing the vertical bed can be designed so that the average retention time of the gravitationally downwardly moving agglomerates therein may be any suitable time, most commonly such beds provide for an average retention time on the order of about 6 or 8 hours up to as much as about 26 or 28 hours. The time-temperature relationship during the heating of agglomerates in the bed should be such that they do not sinter or coalesce into aggregates.

Preferably, the scrap glass, or cullet, having the organic coating thereon which is employed in the present invention is scrap fiber glass, and this scrap glass may be either textile type glass or scrap from insulation products, such as thermal or acoustical insulation. As is well known in the art, the organic coating on textile type glasses is a size which is applied substantially contemporaneous with fiber formation and such sizes may be either hydrophilic, for example, water dispersible or water soluble sizes, or they may be hydrophobic.

Acoustical insulation products or thermal insulation products, when employed as scrap glass, contain an organic thermoset binder. Typically, the size is present on a textile glass in an amount of about 3% by weight or less (based on glass and size), whereas the thermoset binders on an insulating type scrap glass will typically be present in an amount of about 5% to about 8 or 9% by weight. Generally it has been found that the heating to effect pyrolysis of the organic coating of the scrap glass need be somewhat more intense when the scrap glass is in the form of a thermal insulating or an acoustical insulating product than where the scrap glass is a textile type product or glass. Consequently, in the preferred practice of the invention, the recycled glass having organic coating thereon will be a textile type glass. The most commonly manufactured textile type glass is that which is referred to in the art as an E type glass which may be categorized as an alkaline earth boroalumino silicate glass. Such glasses, typically, will comprise at least about 85% by weight and more commonly on the order of about 93 to 95% by weight of silica plus alumina plus alkaline earth metal oxides plus boric oxides. Other adjuvants which have typically been present in such glasses include fluorine, iron oxide, titanium dioxide, and strontium oxide. Alkali metal oxides, if present at all, will usually be present in small amounts, for example, amounts less than about 1% by weight. An exemplary E type glass batch which is suitable for conversion into agglomerates may be formulated from a composition of about 23 to about 24% by weight limestone, about 14 to 15% by weight of calcined colemanite, about 30 to 31% by weight of clay, about 29 to 30% by weight of flint, about 1.5 to 2% by weight of sodium silico fluoride, and about 0.2% by weight of gypsum.

Preferably, the cullet or scrap glass which is employed in the practice of the present invention will be glass fibers and, as previously indicated, the preferred glass fibers will be textile type glass fibers. While the size of the glass fibers employed may vary, it is generally preferred that the maximum dimension of the fibers employed be on the order of about 1 inch or less, more suitably, less than about one-half inch and, most desirably, less than about one-quarter inch, for example, one-thirty second to about one-quarter inch. Additionally, as previously indicated above, the agglomerates may be in the form of pellets or briquettes, but, in accordance with the preferred practice of the present invention, the agglomerates will be pellets. Generally, the pellets may be formed in accordance with the teachings of U.S. Pat. No. 4,212,613. Moreover, the particle size of the pellets employed may be of any convenient selection, but preferably the pellets will be on the order of about three-eighths inch to about five-eighths inch in diameter. In manufacturing the pellets, either of two approaches will be found to be convenient. For example, the scrap fibers to be employed can be mixed, or ground, to the lengths indicated above and supplied directly to the pelletizer, (for example, a rotating disc) without premixing the fibers with the other molten-glass forming ingredients. Alternatively, the fibers may be added directly to the batch and the batch and fibers mixed so as to effect a grinding of the fibers to the lengths indicated above and this premixed batch supplied to the pelletizer. Generally, the fibers will be employed in an amount of about 3 or 4% to as high as 40% by weight based on the weight of the dry batch and fibers. Water, which may be water per se, or, for example, an aqueous caustic solution will be added to the pelletizer so as to produce pellets generally having a moisture content between about 10 to about 20% by weight (wet basis). Those skilled in the art will routinely select the optimum mode of operating the pelletizer for their specific purposes.

Once the pellets are formed, they are dried and preheated in accordance with prior art practices by including the step of passing a gaseous heating medium through a vertical bed of gravitationally downwardly moving pellets or agglomerates. In addition to providing for the economical use of scrap glass, it has been observed that the addition of the scrap glass into the agglomerates has a modest tendency to increase the porosity of the agglomerates. An increase in porosity contributes to a beneficial increase in drying rate and, additionally, this porosity allows for the easier release of water and consequently minimizes adverse disintegration, for example spalling, of the pellets during heating. In order to insure for the pyrolysis of the organic coating from the glass, that is, the thermal decarbonizing of this coating, the heating medium passing through the vertical bed of agglomerates, or pellets, will suitably contain at least about 3% by volume of free oxygen, desirably at least about 5% and, more desirably, at least about 10% by volume of free oxygen. This can be conveniently done by diluting the gases being supplied to the chamber containing the vertical bed with, for example, ambient air or even heated ambient air. Additionally, the pyrolyzing of the coating on the glass will likewise be a function of time and temperature. Those skilled in the art will routinely optimize such time/temperature relationship. Generally, however, since as indicated the vertical beds in the past typically provided for a retention time of between 6 hours up to as much as 26 or 28 hours, ample time will generally exist in such designs to effect the pyrolysis. Such optimization will also be somewhat dependent on the coating on the glass fibers being employed. For example, in air, typical textile type fibers with a size thereon can be conveniently pyrolized at about 1100° F. (593° C.) for a period of about 2 hours, whereas an insulating type glass fiber with its binder for that same time period requires a temperature on the order of about 1500° F. (816° C.). It will be found that a retention time in the vertical bed of at least about 6 or 8 hours will be quite satisfactory.

While the present invention has been described above, it will, of course, be readily apparent that modifications are possible which, pursuant to the patent statutes and laws, do not depart from the spirit and scope thereof.

What is claimed:

1. In a process comprising converting molten-glass forming ingredients and water into agglomerates, heating a vertical bed of gravitationally downwardly moving agglomerates in a chamber by direct contact with a gaseous heating medium so as to produce dry, heated non-aggregated agglomerates, melting said agglomerates in a glass melting furnace, the improvement wherein a portion of said molten-glass forming ingredients includes glass cullet having an organic coating thereon and pyrolyzing said coating during said heating step.

2. The process of claim 1 wherein said gaseous heating medium has a free oxygen content of at least about 3% by volume.

3. The process of claim 2 wherein said gaseous heating medium has a free oxygen content of at least about 5%.

4. The process of claim 2 wherein said cullet comprises glass fibers having an organic size thereon.

5. The process of claim 4 wherein said fibers have lengths of less than about one-half inch.

6. The process of claim 2 wherein said furnace is a combustion fired furnace and said gaseous medium comprises flue gases from said furnace.

7. The process of claim 2 wherein the average retention time of said gravitationally downwardly moving agglomerates is in excess of about two hours.

8. The process of claim 7 wherein said retention time is at least about six hours.

9. The process of claim 5 wherein said fibers have a length of less than about one-quarter inch.

* * * * *